(12) United States Patent
Courtney et al.

(10) Patent No.: US 9,638,178 B1
(45) Date of Patent: May 2, 2017

(54) COLLOID THRUSTER AND METHOD

(71) Applicant: Busek Co., Inc., Natick, MA (US)

(72) Inventors: Daniel Courtney, Framingham, MA (US); Nathaniel Demmons, Mason, NH (US); Peter Wright, Boston, MA (US)

(73) Assignee: Busek Co., Inc., Natick, MA (US)

( * ) Notice: Subject to any disclaimer, the term of this patent is extended or adjusted under 35 U.S.C. 154(b) by 89 days.

(21) Appl. No.: 15/098,954

(22) Filed: Apr. 14, 2016

(51) Int. Cl.
*H01J 49/00* (2006.01)
*H01J 49/04* (2006.01)
*B01D 59/44* (2006.01)
*B01D 59/46* (2006.01)
*F03H 1/00* (2006.01)
*B64G 1/40* (2006.01)

(52) U.S. Cl.
CPC ........... *F03H 1/0012* (2013.01); *B64G 1/402* (2013.01); *B64G 1/405* (2013.01); *F03H 1/0031* (2013.01)

(58) Field of Classification Search
USPC ........ 250/281, 282, 284, 288; 219/496, 524; 239/22, 42, 43, 86, 145, 452, 533.1, 239/533.2, 695, 706, 708; 60/200.1, 60/202.1, 221, 222, 325, 335, 356, 545, 60/556, 557, 560, 561, 564, 721, 911
See application file for complete search history.

(56) References Cited

U.S. PATENT DOCUMENTS

| | | | | |
|---|---|---|---|---|
| 7,105,810 B2* | 9/2006 | Kameoka | ............ | H01J 49/0018 210/656 |
| 7,932,482 B2* | 4/2011 | Norwood | ............ | A01M 1/2077 219/494 |
| 7,932,492 B2* | 4/2011 | Demmons | ............ | H01J 49/165 250/288 |
| 8,324,593 B2* | 12/2012 | Lozano | ................. | F03H 1/0012 250/281 |
| 8,448,419 B2* | 5/2013 | Demmons | ............ | B05B 5/0255 313/231.01 |
| 8,785,881 B2* | 7/2014 | Lozano | ................... | H01J 37/08 250/282 |
| 8,791,411 B2* | 7/2014 | Lozano | ................... | H01J 37/08 250/281 |
| 8,907,578 B2* | 12/2014 | Hruby | ..................... | H05H 1/00 315/201 |

(Continued)

OTHER PUBLICATIONS

Courtney et al., "Performance and Applications of Ionic Electrospray Micro-Propulsion Prototypes", AIAA Space 2015, Aug. 30 to Sep. 2, Pasadena, CA, pp. 1-10.

(Continued)

*Primary Examiner* — Bernard Souw
(74) *Attorney, Agent, or Firm* — Iandiorio Teska & Coleman, LLP

(57) ABSTRACT

An ion electrospray device with a porous reservoir and at least one porous emitter includes a porous compliant interface sandwiched between the porous reservoir and the porous emitter for transferring fluid from the porous reservoir to the porous emitter. The interface has a characteristic capillary pressure stronger than the characteristic capillary pressure of the porous reservoir to fill the porous emitter with fluid via a fluid injection section of the interface and before the porous reservoir is then partially filled with fluid. Emitter leakage and propellant bridging problems are addressed.

30 Claims, 7 Drawing Sheets

(56) References Cited

U.S. PATENT DOCUMENTS

2013/0140385 A1* 6/2013 Demmons ............ B05B 5/0533
                                                    239/706
2016/0168437 A1* 6/2016 Demmons .............. B65D 83/00
                                                    548/335.1
2016/0333865 A1* 11/2016 Demmons ................ C09K 3/30

OTHER PUBLICATIONS

Courtney et al., "Performance and Applications of Ionic Electrospray Micro-Propulsion Prototypes", EPFL, Switzerland, AIAA-2015-4672, pp. 1-20.

Courtney et al., "Influences of Porous Reservoir Laplace Pressure on Emissions From Passively Fed Ionic Liquid Electrospray Sources", Applied Physics Letters, 107, 103504 (2015), (five (5) pages).

* cited by examiner

COLLOID THRUSTER AND METHOD

FIELD OF THE INVENTION

This invention relates to ion electrospray devices such as colloid thrusters.

BACKGROUND OF THE INVENTION

A colloid (ion electrospray) thruster includes an emitter receiving a propellant such as an ionic liquid from a reservoir and positioned near an electrode or extractor grid. A voltage is applied between the emitter and the electrode to produce a Taylor cone of ions providing thrust. See U.S. Pat. Nos. 8,785,881 and 8,324,593 incorporated herein by this reference.

To avoid the need for a propellant pressurization system onboard a spacecraft used to deliver propellant from the reservoir to the emitter, a porous propellant reservoir and a porous emitter may be used with propellant transferred from the reservoir to the emitter by capillary action. See Courtney, Daniel G. and Shea, Herbert, "Influences of Porous Reservoir Laplace Pressure on Emissions from Passively Fed Ionic Liquid Electrospray Sources," Applied Physics Letters 107, (2015) incorporated herein by this reference.

If the reservoir is fully filled with ionic liquid, the ionic liquid can leak out of the emitter tip and form a bridge between the emitter and the electrode resulting in a failure of the thruster. See Courtney, Daniel G. et al. "Performance and Applications of Ionic Electrospray Micro-Propulsion Prototypes," ATAA Space (2015), AIAA paper 2015-222013 incorporated herein by this reference. Partially filling the reservoir can alleviate this particular problem but then the possibility exists that they will be a void or gap of ionic liquid between the reservoir and the emitter again resulting in thruster failure.

SUMMARY OF THE INVENTION

A favorable operational condition is reached if the reservoir—emitter system is not completely filled with liquid and the reservoir characteristic capillary forces are less than those of the emitter yet larger than any other incidental effective capillaries in the flow path. If these conditions are met, the emitter is consistently filled with liquid facilitating emission and yet any excess liquid accumulation is retained in the system due the suction imparted by the unfilled reservoir. Liquid leaks are therefore suppressed. The particular characteristic capillary forces of the reservoir will also influence the emission properties of an electrospray beam regardless of the emitter pore size. One drawback of this configuration, particularly for space applications, is the relatively large tank mass incurred by using a porous reservoir capable of enforcing appropriate capillary forces. An appropriate porous reservoir may have an open volume as low as approximately 15% and be made of a material with a relatively high density compared with a stored liquid. If the reservoir is filled by directly flowing in less fluid than the reservoir capacity, a gap in the bulk liquid to the emitter flow path at its outlet could occur. Without active pressurization or continuous porosity gradients, no mechanism exists to remove such gaps. An engineered gradient in the reservoir porosity could suppress such risks, however, these techniques are challenging to implement and the resulting emitter is costly to fabricate. See U.S. Pat. Nos. 8,791,411 and 8,324,593 both incorporate herein by this reference.

Preventing thruster failure is accomplished, in one preferred example, by employing a porous compliant interface between the thruster reservoir and the emitter and using the porous compliant interface to fill the emitter first with propellant and to then partially fill the reservoir. In use, the interface acts to transfer propellant from the reservoir to the emitter. The interface preferably has a characteristic capillary pressure stronger than the characteristic capillary pressure of the reservoir. So, a liquid bridge is then formed between the reservoir and the emitter without the risk of overfilling the reservoir as could occur if liquid were added directly to the reservoir. The result is an equilibrium in capillary forces between the emitter and reservoir preventing leakage at the emitter and bridging of the propellant from the reservoir to the emitter.

Featured is an ion electrospray device comprising a porous reservoir, at least one porous emitter, and a porous compliant interface between the porous reservoir and the porous emitter for transferring fluid from the porous reservoir to the porous emitter. The characteristic capillary pressure of the reservoir is less than that of the emitter. The interface has a fluid injection section for filling the emitter and reservoir. The interface has a characteristic capillary pressure stronger than the characteristic capillary pressure of the porous reservoir in order to fill the porous emitter first with fluid via the fluid injection section and the interface before the porous reservoir is then partially filled with fluid via the fluid injection section and the interface.

The reservoir characteristic capillary pressure is preferably less than that of the interface. And, the reservoir characteristic capillary pressure is also preferably less than that of the emitter. In terms of pore size for similar materials, the reservoir characteristic pore size may be larger than that of the interface and the reservoir characteristic pore size may be larger than that of emitters. The interface characteristic capillary pressure may be stronger than the emitter. In terms of pore size, the interface characteristic pore size may be smaller than that of the emitter.

In one design, the porous compliant interface is a sheet of metal fiber matting, a porous glass fiber, porous paper, or a porous plastic material sandwiched between the porous emitter and porous reservoir. The porous reservoir and the porous emitter may have a uniform porosity.

In one version, at least one storage vessel is used for transferring liquid therein to the interface fluid injection section. The storage vessel may include a heater for heating a solid ionic liquid stored in the vessel to a liquid transferred to the porous emitter and porous vessel via the porous interface fluid injection section in fluid contact with the liquid. The system may also include an actuator configured to bring the porous interface fluid injection section into fluid contact with the liquid stored in the storage vessel.

In some embodiments, there are a plurality of storage vessels and/or a plurality of porous emitters in fluid contact with the porous reservoir via the porous compliant interface.

Also featured is a method comprising employing a porous interface between a porous reservoir and at least one porous emitter. The fluid injection section of the porous interface is brought into communication with a fluid which first fills the porous emitter. An equilibrium in capillary forces is established between the porous emitter and the porous reservoir by only partially filling the porous reservoir.

The method may further include transferring liquid stored in a storage vessel to the interface fluid injection section. The fluid injection section of the porous interface may be fluidly connected with the liquid stored in the storage vessel.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1B:
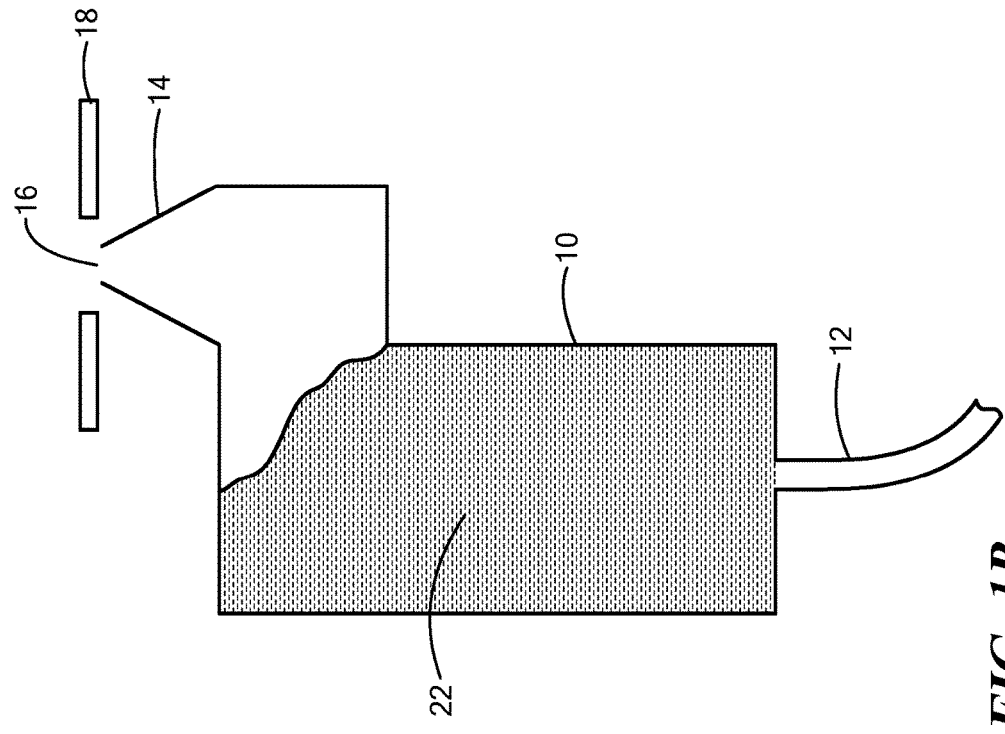
FIG. 1B is a schematic cross sectional view of an emitter reservoir configuration subject to propellant gapping between the emitter and the reservoir.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1A:
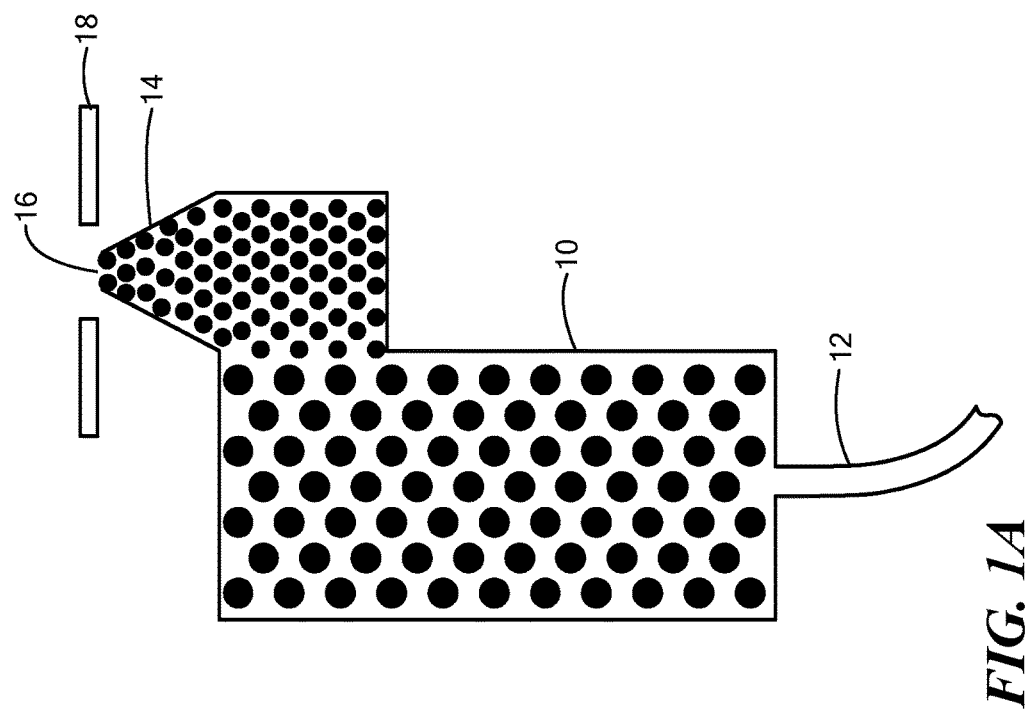
FIG. 1A is a schematic cross sectional view showing a prior art emitter and reservoir arrangement subject to propellant leakage by the emitter.
Figure 2A:
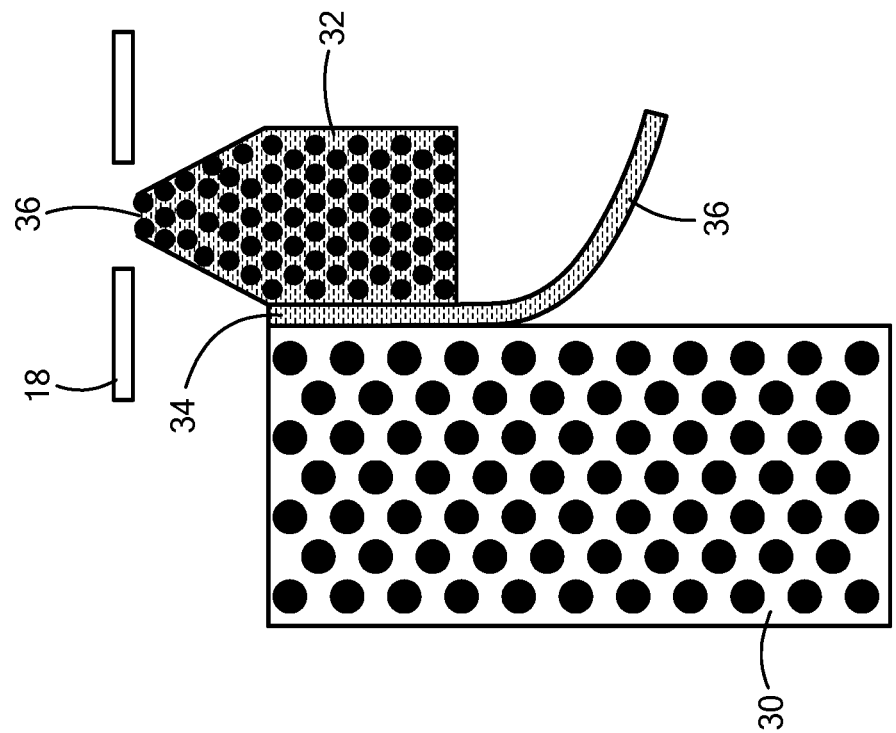
FIGS. 2A-2D are schematic cross sectional views of an example of an electrospray device where a porous compliant interface is disposed between the liquid reservoir and the emitter and used to fill the emitter first with propellant.
Figure 2B:
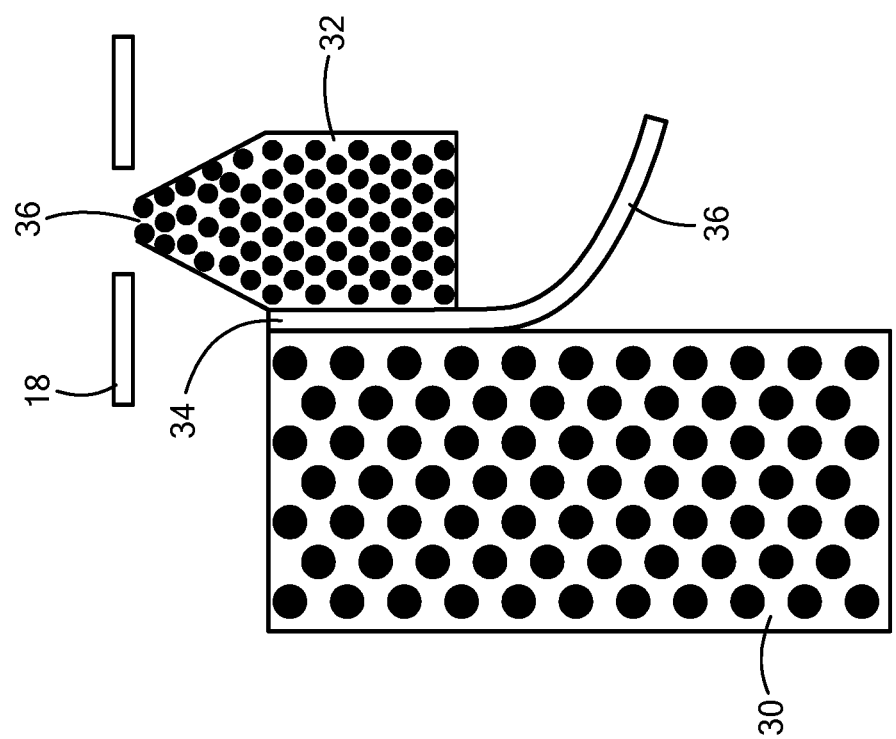

As discussed in the Background section above, a porous reservoir first filled with a liquid (e.g., a propellant such as an ionic liquid) by port 12, FIG. 1A can result in a leakage of fluid out of emitter 14 tip 16 and even a bridge between tip 16 and electrode 18 resulting in failure. Only partially filling the reservoir 10 as shown in FIG. 2B can prevent emitter leakage but then there is the possibility that a fluid gap condition could exist as shown at 20 where fluid 22 in vessel 10 is not in fluid contact with emitter 14.

In one preferred embodiment, shown in FIGS. 2A-2D, porous reservoir 30 (e.g., a block of constant pore-size porous metal, or non-metal, supported by a mounting structure, or a stainless steel housing filed with a constant pore size frit material) and metal porous emitter 32 (configured as a needle, emitters in an array, a linear emitter, an annular emitter, flat needles in an array, or the like) are in fluid communication via porous compliant interface 34 having a fluid injection section 36. Interface 34 may be a thin sheet of metal fiber matting, a porous glass fiber, porous paper, a porous plastic material, or the like sandwiched between the porous emitter and porous reservoir. Interface 34 is thus in fluid communication with reservoir 30 and emitter 32 and, as shown, preferably also in physical communication between reservoir 30 and emitter 32. Emitter 32 may have pores of a constant size and interface 34 too may have constant size pores. A force between the reservoir 30 and 32 emitter to provide compression of the interface 34 may be provided through their external housing or by joining the reservoir 30 and emitter 32 directly while under compression.

Ionic liquid, for example, can be injected into injection section 36 or injection section 36 can be brought into contact with the ionic fluid in a vessel, for example. The emitter 32 has characteristic capillary pressure stronger than the characteristic capillary pressure of the porous reservoir and thus the emitter 32 is filled with ionic fluid first as ionic liquid proceeds from the interface injection section 36 along interface 34 and into emitter 32 as shown in FIG. 2B. Typically, the porous reservoir 30 has a larger characteristic pore size than the characteristic pore size of the emitter 32 and the interface 34 has a characteristic pore size smaller than the characteristic pore size of the porous reservoir 30 and may be smaller than the characteristic pore size of porous emitter 32. But, there are other ways to render the characteristic capillary pressure of the interface and emitter stronger than the characteristic capillary pressure of the porous reservoir 30.

Figure 2D:
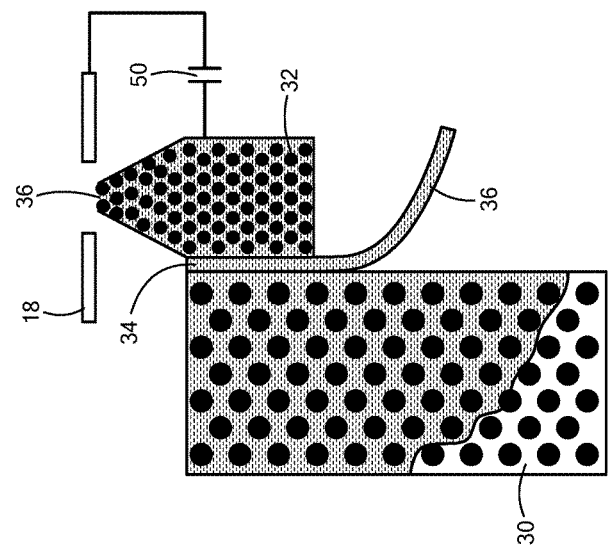
Figure 2C:
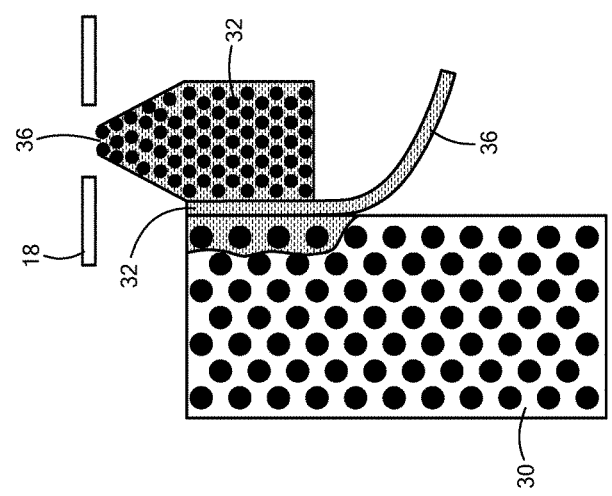

After emitter 32 is filled with ionic fluid, only then does reservoir 30 begin to fill as shown in FIG. 2C. But, care is taken to only partially fill reservoir 30 as shown at 40 in FIG. 2D where this portion of the reservoir, remote from the interface 34 and emitter 32 is not fully filled with ionic liquid. Thereafter, interface 34 injection section 36 may either be removed or sealed in some fashion. Because reservoir 30 is only partially filled and due to the choice of the characteristic capillary pressures (e.g., pore sizes) of vessel 30, emitter 32, and interface 34, the system is in equilibrium. Preferably and once the emitter is filled, the equilibrium capillary forces between emitter 32 and reservoir 30 are equal and opposing thus preventing leakage of ionic fluid out of the emitter tip 38 yet with a bridge of ionic liquid between the vessel 30 and emitter 32 maintained through the interface 34. In operation, a voltage such as shown at 50 in FIG. 2D is applied between electrode 18 and any conductive surface such as emitter 32, vessel 40, or the like to product thrust.

In some embodiments, the interface, emitter, and reservoir may be filled with the liquid in flight. For example, the satellite or other space vehicle may include one or more liquid storage vessels containing, for example, an ionic liquid. The porous interface fluid injection section may be brought into contact with the ionic liquid stored in a storage vessel under control of a system controller to draw, by capillary action, ionic liquid to the porous interface, then filling the emitter(s), and then partially filling the reservoir. If the ionic liquid is stored in the storage vessel(s) in solid form, vessel heaters may be used and energized by the control system to liquefy the ionic liquid. The use of extended interface materials as so described serve as an on-demand injection wick facilitating liquid transfer from high open volume storage vessels to the porous reservoirs. The extended interface material may be brought into contact with liquid in the high open volume supply of liquid through mechanical motion or some other means to govern flow (such as a valve or by solidifying the stored liquid).

Figure 3A:
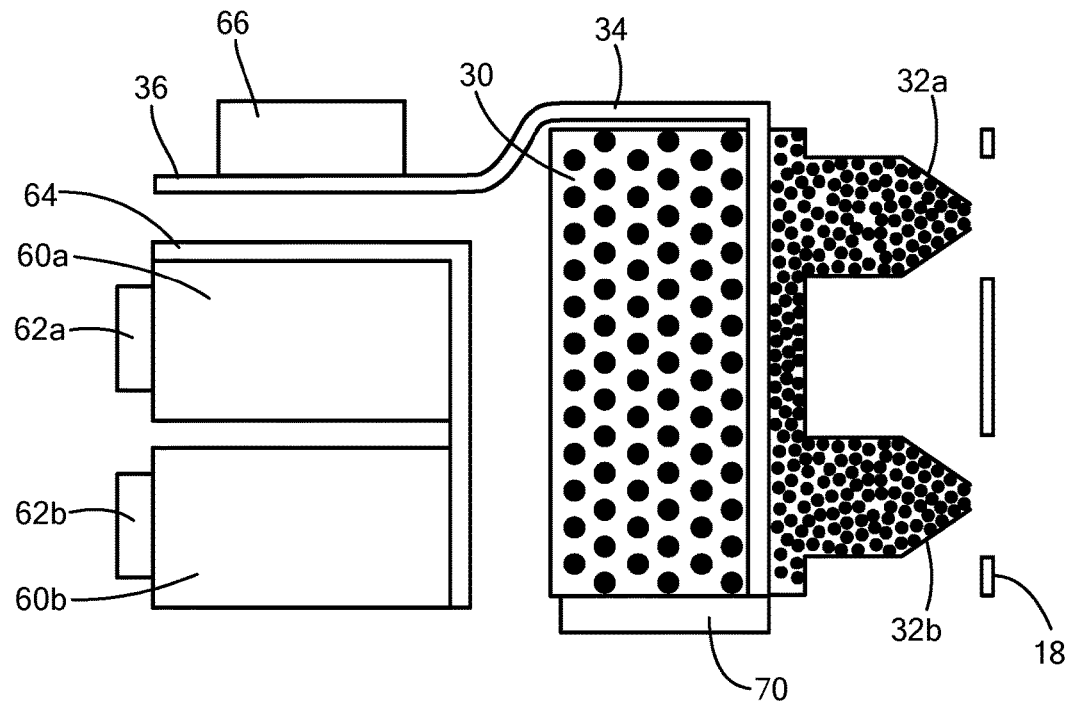
FIGS. 3A-3E are schematic cross sectional views showing an example where one or more liquid storage vessels are included for transferring liquid stored therein to the porous interface.
Figure 3B:
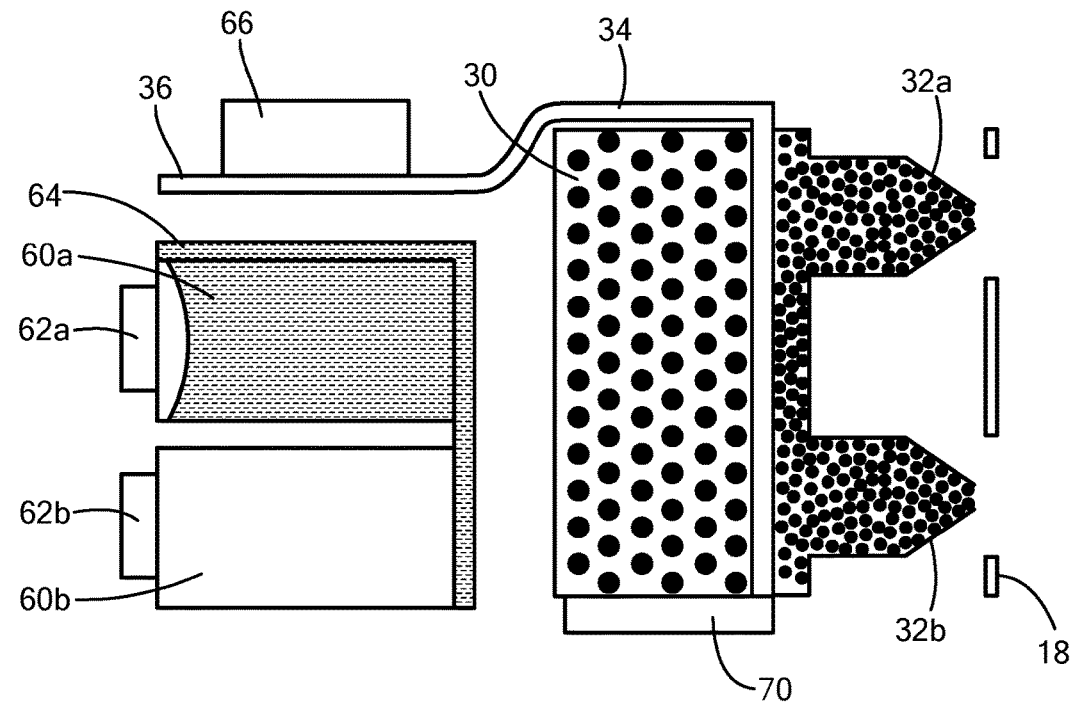
Figure 3C:
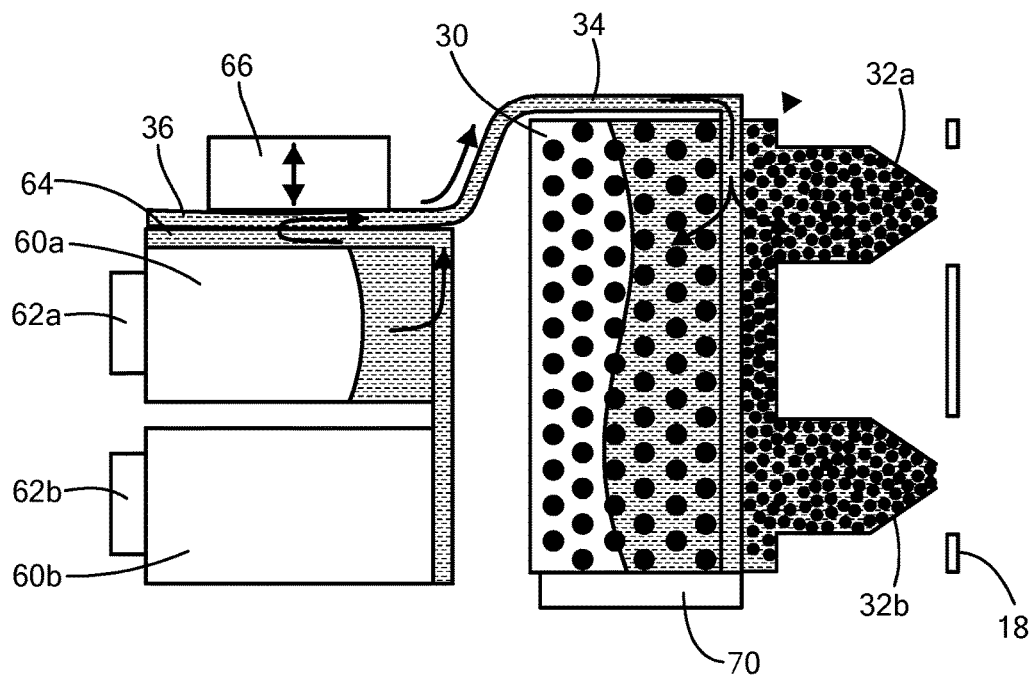
Figure 3D:
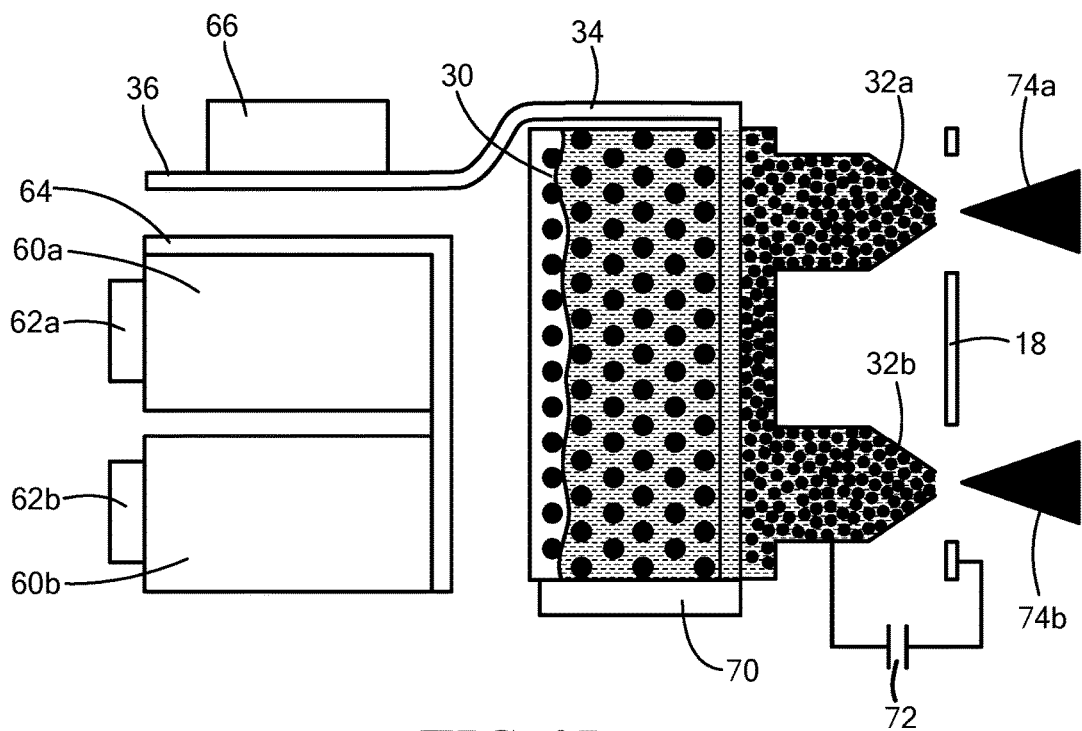

FIG. 3A shows an example where storage vessels 60*a* and 60*b* each include a heater 62*a*, 62*b*. A porous membrane 64 is in fluid communication with the ionic liquid in each vessel. Porous interface 34 is sandwiched between porous emitters 32*a* and 32*b* and porous reservoir 30 and includes fluid injection section 36 proximate or in contact with porous membrane 64. If a room temperature solid propellant is used, porous fluid injection section 36 may be brought into contact with porous membrane 64. If a room temperature liquid propellant is used, heater 62a, 62b may not be required and an actuator such as a micro actuator 66 may be used to selectively engage porous fluid injection section 36 with porous membrane 64 under the control of the system controller. FIG. 3B shows how, in flight, heater 62a is energized liquefying the ionic liquid in vessel 60a and FIG. 3C shows micro actuator 66 energized driving injection section 36 into engagement with porous member 64 urging ionic liquid to fill emitters 32a, 32b and then partially filling reservoir 30. A reservoir heater 70 may also be included and energized as shown in FIGS. 3B, 3C, and 3D. In operation, voltage source 72, FIG. 3D is turned on to produce Taylor cones that emit charged particle beams 74a, 74b at the emitter tips.

Figure 3E:
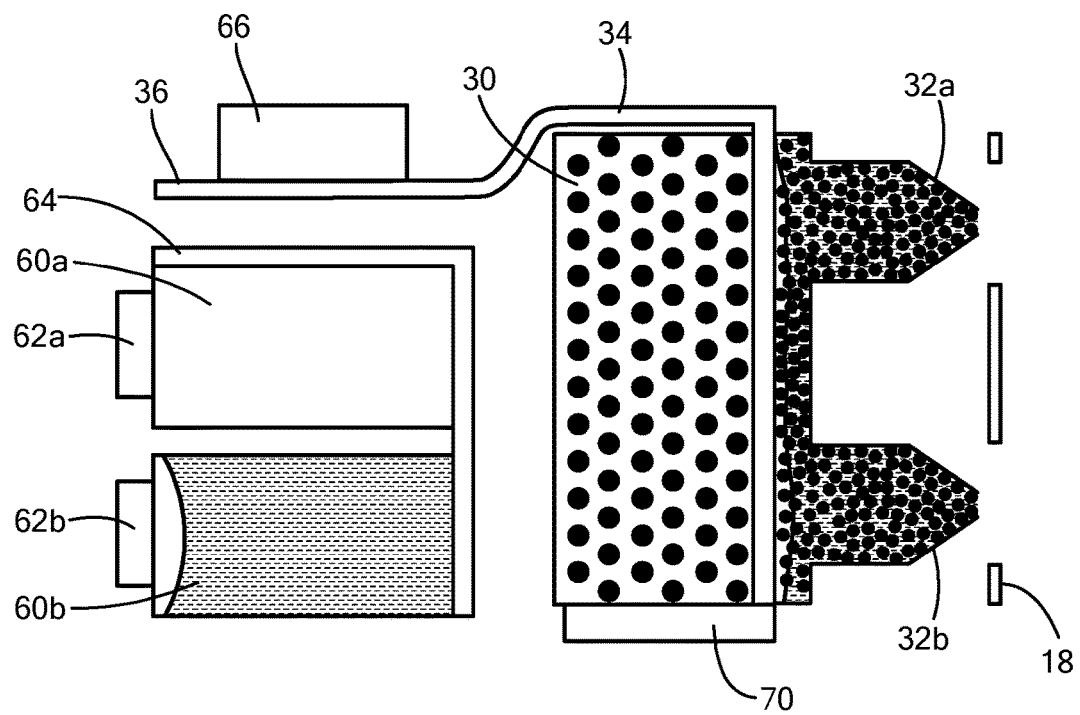

When vessel 60a is depleted of ionic liquid, as shown in FIG. 3E, the steps described above are repeated to now heat vessel 60b and fill emitters 32a, 32b and to partially fill reservoir 30 using ionic liquid stored in vessel 60b.

Figure 4:
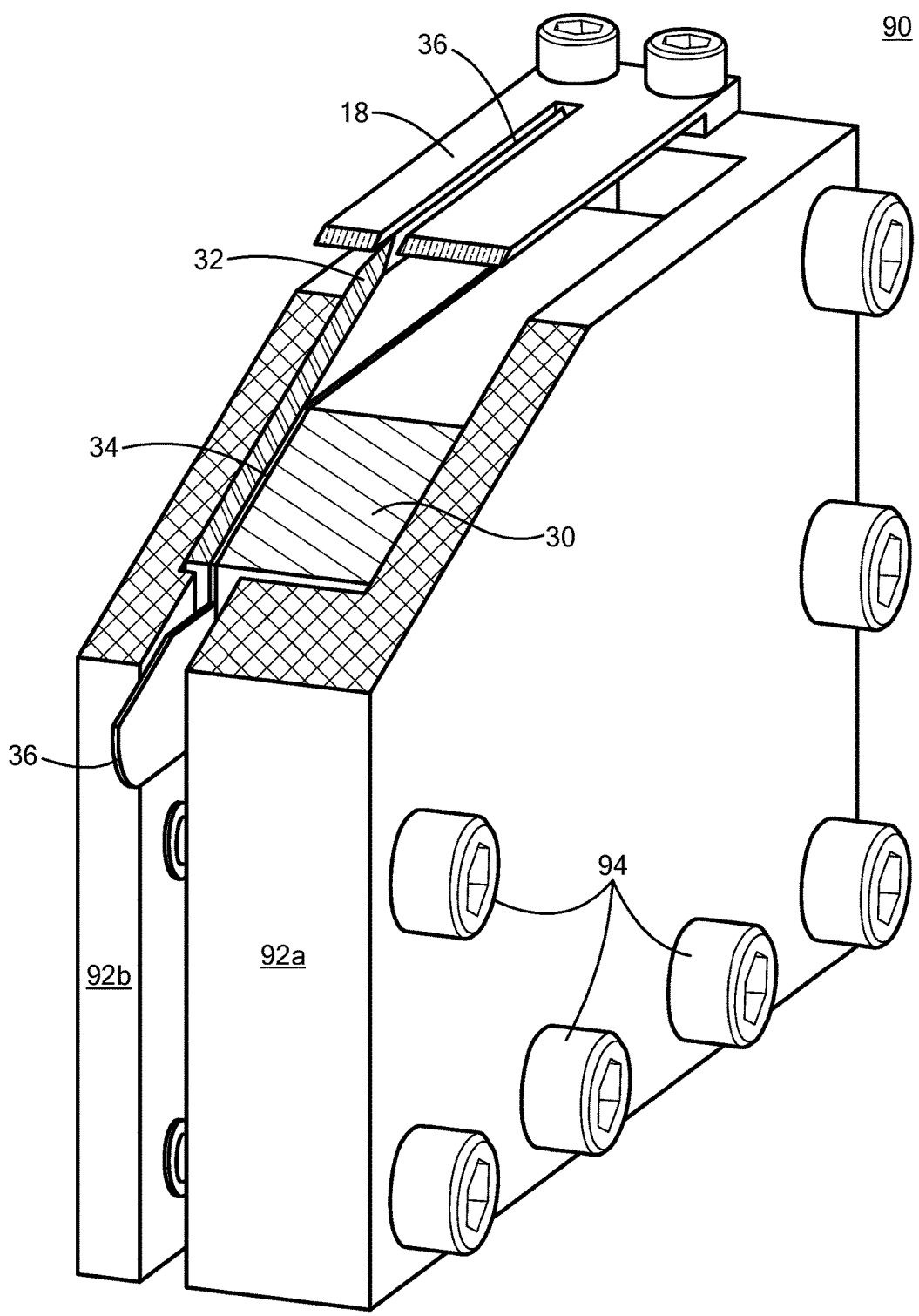
FIG. 4 is a three dimensional partially cut-away schematic view of an example of an electrospray emitter device.

FIG. 4 shows an electrospray device 90 where housing sections 92a and 92b sandwich interface 34 between reservoir 30 and linear emitter 32. Fasteners 94 compress the two housing sections together and compress interface between reservoir 30 and emitter 32.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. An ion electrospray device comprising:
   a porous reservoir;
   at least one porous emitter;
   a porous compliant interface between the porous reservoir and the porous emitter for transferring fluid from the porous reservoir to the porous emitter;
   the interface having a fluid injection section; and
   the interface having a characteristic capillary pressure stronger than the characteristic capillary pressure of the porous reservoir to fill the porous emitter with fluid via the fluid injection section and the interface before the porous reservoir is partially filled with fluid via the fluid injection section and the interface.

2. The device of claim 1 in which the reservoir has a characteristic capillary pressure less than the characteristic capillary pressure of the porous emitter.

3. The device of claim 1 in which the porous reservoir has a larger characteristic pore size than the characteristic pore size of the emitter.

4. The device of claim 3 in which the porous reservoir has a characteristic pore size smaller than the characteristic pore size of the porous interface.

5. The device of claim 1 in which the characteristic capillary pressure of the interface is stronger than the characteristic capillary pressure of the emitter.

6. The device of claim 5 in which the interface has a characteristic pore size smaller than the characteristic pore size of the porous emitter.

7. The device of claim 1 in which the porous compliant interface is a sheet of metal fiber matting, a porous glass fiber, porous paper, or a porous plastic material sandwiched between the porous emitter and porous reservoir.

8. The device of claim 1 in which the porous reservoir has a uniform porosity.

9. The device of claim 1 in which the porous emitter has a uniform porosity.

10. The device of claim 1 further including at least one storage vessel for transferring liquid therein to the interface fluid injection section.

11. The device of claim 10 in which the storage vessel includes a heater for heating a solid ionic liquid stored in the vessel to a liquid transferred to the porous emitter and porous vessel via the porous interface fluid injection section in fluid contact with the liquid.

12. The device of claim 10 further including an actuator configured to bring the porous interface fluid injection section into fluid contact with the liquid stored in the storage vessel.

13. The device of claim 10 further including a plurality of storage vessels.

14. The device of claim 1 further including a plurality of porous emitters in fluid contact with the porous reservoir via the porous compliant interface.

15. The device of claim 1 further including housing sections compressing the interface between the emitter and the reservoir.

16. A method comprising:
    employing a porous interface between a porous reservoir and at least one porous emitter;
    the porous interface including a fluid injection section;
    bringing the fluid injection section of the porous interface into communication with a fluid;
    urging fluid to first fill the at least one porous emitter; and
    establishing an equilibrium in capillary forces between the porous emitter and the porous reservoir by only partially filling the porous reservoir.

17. The method of claim 16 in which the reservoir has a characteristic capillary pressure less than the characteristic capillary pressure of the porous emitter.

18. The method of claim 17 in which the porous reservoir has a larger characteristic pore size than the characteristic pore size of the emitter.

19. The method of claim 16 in which the porous reservoir has a characteristic pore size smaller than the characteristic pore size of the porous interface.

20. The method of claim 16 in which the characteristic capillary pressure of the interface is stronger than the characteristic capillary pressure of the emitter.

21. The device of claim 20 in which the interface has a characteristic pore size smaller than the characteristic pore size of the porous emitter.

22. The method of claim 16 in which the porous compliant interface is a sheet of metal fiber matting, a porous glass fiber, porous paper, or a porous plastic material sandwiched between the porous emitter and porous reservoir.

23. The method of claim 16 in which the porous reservoir has a uniform porosity.

24. The method of claim 16 in which the porous emitter has a uniform porosity.

25. The method of claim 16 further including transferring liquid stored in a storage vessel to the interface fluid injection section.

26. The method of claim 25 further including fluidly connecting the fluid injection section of the porous interface with the liquid stored in the storage vessel.

27. The method of claim 26 further including employing an actuator configured to bring the porous interface fluid injection section into fluid contact with a liquid stored in the storage vessel.

28. The method of claim 25 further including a plurality of storage vessels.

29. The method of claim 16 further including a plurality of porous emitters in fluid contact with the porous reservoir via the porous compliant interface.

30. The method of claim 16 further including compressing the porous interface between the porous emitter and the porous reservoir.

* * * * *